Oct. 24, 1950　　　　　J. A. HARDY　　　　　2,526,744
VIBRATION DAMPER
Filed June 19, 1946

INVENTOR.
JAMES A. HARDY.
BY
Lockwood, Goldsmith & Galt.
ATTORNEYS.

Patented Oct. 24, 1950

2,526,744

UNITED STATES PATENT OFFICE 2,526,744

VIBRATION DAMPER

James A. Hardy, Indianapolis, Ind., assignor to Schwitzer-Cummins Company, Indianapolis, Ind., a corporation Application June 19, 1946, Serial No. 677,689

1 Claim. (Cl. 74—574)

This invention relates to a vibration damper, illustrated herein as mounted on a crank shaft of an internal combustion engine, although it is adaptable to any other shaft, particularly when rotated by an internal combustion engine and subjected to torsional deflection produced by the explosive forces thereof.

The principal object of the invention consists in the structural arrangement, form and relation of the elements making up the damper for convenient and economical production and assembly, and particularly wherein the damper structure may incorporate and include a driving pulley for accessories such as the cooling fan of an engine. To this end the damper is assembled from pre-formed parts which may comprise sheet metal stampings, pressed and secured in assembled relation with resilient material such as rubber interposed between a supporting plate connected to the shaft and an inertia element clamped therewith. This arrangement avoids the necessity of vulcanizing or surface bonding the interposed rubber or similar resilient material as between the support and the inertia element, while at the same time obtaining the desired shearing action of the rubber or resilient material to permit relative rotational movement between the inertia element and the supporting plate of the shaft.

The full nature of the invention will be understood from the accompanying drawings and the following description and claim:

Figure 1:
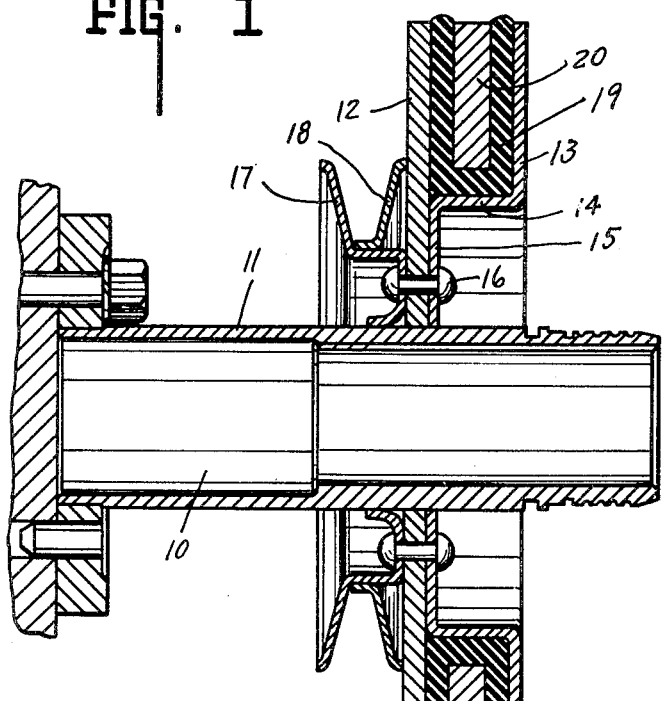
Fig. 1 is a central vertical section through the damper.
Figure 2:
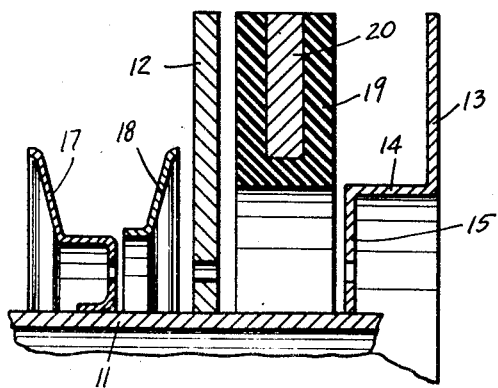
Fig. 2 is an exploded view of the parts before assembly with parts broken away.

In the drawings there is shown a shaft 10, to which a sleeve 11 is secured for providing a hub portion upon which a vibration damper and fan driving pulley is mounted. The vibration damper is formed by securing to the sleeve 11 a radially extending supporting plate 12. Associated with and secured to said plate on one side thereof, there is a cupped clamping plate 13 preferably stamped from sheet metal, said clamping plate being formed with a rearwardly extending cup-like portion offset inwardly to provide a shoulder 14 and a web portion 15 which lies against and is secured to the supporting plate 12 by the rivets 16. Said rivets also secure to the supporting plate a pulley section 17 which in turn clamps in place the mating pulley section 18.

Seated within and between the supporting plate 12 and clamping plate 13 about their outer peripheral faces there is a disk 19 of resilient material. Said disk is bifurcated about its outer portion so that it is U-shaped in cross section with its transverse face seated about the shoulder portion 14 of the clamping plate. Carried within said disk so as to be seated upon its transverse face and lie between the spaced outwardly extending flanges thereof, there is an inertia element 20.

The inertia element is in the form of a metal ring elongated radially to provide opposed faces of substantial surface area. The radial flanges of the rubber disk are coextensive and lie in engagement with the opposite faces of the inertia element 20. Similarly, the supporting plate 12 engages the face of the flange of the rubber disk adjacent thereto and is coextensive therewith, as is the clamping plate 13 in respect to the opposed flange. The clamping plate is so formed that when secured to the supporting plate by the rivets 16, it clamps the rubber disk and inertia element thereto under sufficient tension to prevent displacement of the adjacent engaged surfaces while permitting relative movement between the inertia element and said plates through the yielding shearing action of the rubber.

Figure 3:
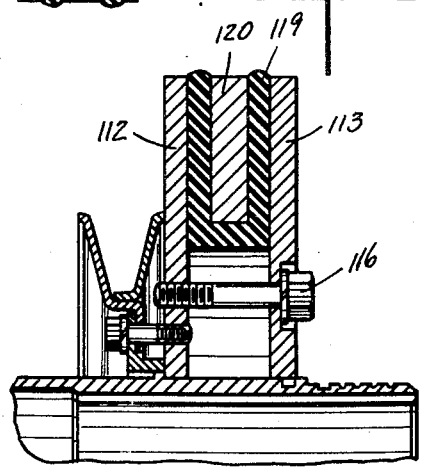
Fig. 3 is the same as Fig. 1 with parts broken away, showing a modified form.

In the modified form of Fig. 3 the hub portion of the sleeve 11 has secured thereto a pair of clamping plates 112, 113, both of which also serve as supporting plates. Between them is clamped the rubber disk 119 having radial flanges for embracing the inertia element 120 therebetween. The inertia element is clamped within the disk and the disk is clamped between the plates 112 and 113 by the bolts 116. Thus, the engaged faces of the rubber disk are clamped against displacement relative to the supporting plates and the inertia element is similarly held against displacement relative to the engaging faces of the rubber disk while the shearing action due to the elasticity of the rubber will permit the desired relative movement between the supporting plates and the inertia element.

The invention claimed is:

In a vibration damper for rotating shafts, the combination with a sleeve adapted to be secured to a shaft and having a hub portion, a radially extending supporting plate secured on and about said hub portion, a sheet metal clamping plate having an outer offset portion spaced from said supporting plate, the inner portion of said clamping plate being offset inwardly, a rubber disk seated about the peripheral portion of the inward offset portion of said clamping plate having face to face engagement with the inner faces thereof and said supporting plate, said rubber disk being U-shaped in cross section to provide an annular radially extending recess, an annular inertia element mounted within and radially coextensive with the recess of said rubber disk for face to face frictional engagement with the inner faces of said disc free of surface bonding, said element, disc and clamping plates having their respective outer peripheries at the same radial distance from said hub therewith, and means for securing the inward offset portion of said clamping plate directly against the inner portion of said supporting plate for clamping said rubber disk therebetween and causing said rubber disk to clamp said inertia element against relative displacement of their respective frictionally engaging faces while permitting relative movement between said element and plates through the resilient shearing action of the rubber disk.

JAMES A. HARDY.

REFERENCES CITED

The following references are of record in the file of this patent:

UNITED STATES PATENTS

| Number | Name | Date |
|---|---|---|
| 1,925,072 | Griswold | Aug. 29, 1933 |
| 2,201,932 | Tibbetts | May 21, 1940 |

FOREIGN PATENTS

| Number | Country | Date |
|---|---|---|
| 718,411 | France | Nov. 4, 1931 |

OTHER REFERENCES

SAE Journal (Transactions), vol. 53 No. 8, page 480, August 1945.